United States Patent
Montes Linares

(10) Patent No.: US 7,346,045 B2
(45) Date of Patent: Mar. 18, 2008

(54) METHOD AND SYSTEM FOR BIT RATE ADAPTATION

(75) Inventor: Hector Montes Linares, Malaga (ES)

(73) Assignee: Nokia Corporation, Espoo (FI)

( * ) Notice: Subject to any disclaimer, the term of this patent is extended or adjusted under 35 U.S.C. 154(b) by 654 days.

(21) Appl. No.: 10/488,211

(22) PCT Filed: Sep. 4, 2001

(86) PCT No.: PCT/IB01/01868

§ 371 (c)(1),
(2), (4) Date: Mar. 25, 2004

(87) PCT Pub. No.: WO03/021854

PCT Pub. Date: Mar. 13, 2003

(65) Prior Publication Data

US 2004/0233895 A1  Nov. 25, 2004

(51) Int. Cl.
*H04L 12/66* (2006.01)
(52) U.S. Cl. ............... 370/352; 370/235; 370/230
(58) Field of Classification Search ........... 370/352, 370/468, 477, 252, 331, 337, 230, 395.4, 370/235; 455/452.2, 67.13, 452.1, 450, 439
See application file for complete search history.

(56) References Cited

U.S. PATENT DOCUMENTS

| 5,699,365 A | 12/1997 | Klayman et al. |
| 5,745,480 A * | 4/1998 | Behtash et al. ............. 370/252 |
| 6,889,050 B1 * | 5/2005 | Willars et al. ........... 455/452.2 |
| 2003/0125028 A1 * | 7/2003 | Reynolds .................. 455/437 |

FOREIGN PATENT DOCUMENTS

| EP | 1 024 638 A1 | 8/2000 |
| EP | 1 069 721 A2 | 1/2001 |
| WO | WO 98/03030 | 1/1998 |
| WO | WO 00/78081 A1 | 12/2000 |
| WO | WO 01/31832 A1 | 5/2001 |

\* cited by examiner

*Primary Examiner*—Melur Ramakrishnaiah
(74) *Attorney, Agent, or Firm*—Squire, Sanders & Dempsey, LLP

(57) ABSTRACT

A method and apparatus for controlling a parameter of a data stream comprising data transmitted via a communication link in a wireless communication system. The apparatus includes means arranged to determine if the parameter satisfies an acceptable level and means for initiating, if the parameter does not satisfy the acceptable level, a procedure whereby a condition of the communication link is varied until the parameter satisfies the acceptable level.

26 Claims, 5 Drawing Sheets

METHOD AND SYSTEM FOR BIT RATE ADAPTATION

The present invention relates to a method and apparatus for determining whether a parameter of a data stream in a communication system satisfies a predetermined quality. In particular, but not exclusively, the method and apparatus can be used to determine whether a predefined quality of service requested for a communication link is satisfied.

Various user equipment (UE) such as computers (fixed or portable), mobile telephones, personal data assistants or organisers and so on are known to the skilled person and these can be used to communicate with other user equipment in a communication system or to access the Internet to obtain services. Mobile user equipment is often referred to as a mobile station (MS) and can be defined as a means which is capable of communication via a wireless interface with another device such as a base station of a mobile telecommunication network or any other station. Such a mobile user equipment can be adapted for voice, text message or data communication via the wireless interface.

The need to support voice services and user mobility has led to standardisation of the Global System for Mobile communication (GSM) by the European Telecommunications Standards Institute (ETSI). Whilst in addition to speech applications, GSM can provide some circuit-switched data services such as facsimile transmission and short messaging services (SMS), recent developments in mobile computing devices and the emerging market of multimedia communications means there is an increasing demand for more advanced data service providers in GSM. This has led to standardisation of several new data-bearer services as part of GSM Phase 2+, namely, High-Speed Circuit-Switched Data Service (HSCSD), Enhanced Data Rates for GSM Evolution (EDGE) and General Packet Radio Service (GPRS), which operate in circuit-switched and packet-switched modes, respectively. New GSM/EDGE Radio Access Network (GERAN) has evolved from GSM and EDGE. GERAN can be connected to the same packet based 3G core network as UTRAN.

GPRS Technology is overlaid on the existing GSM infrastructure. GPRS and GSM services share dynamically the same radio resources and the same radio channel structure.

In GPRS, up to eight user equipment devices can be dynamically multiplexed on the same radio channel if they require low bit rates, and eight radio channels can be allocated to one user with high-bandwidth requirements. Thus, GPRS provides flexible bandwidth allocation and is economical to users.

GPRS also enables different Quality of Service (QoS) to be supported. The definition of QoS enables each communication link/connection to be assigned a specific QoS with specific requirements (for example bandwidth, bit rate/throughput, delay or bit error ratio). This QoS support together with a high transmission rate enables the transmission of various different data streams such as video, voice and data. This also enables some users to have guaranteed standards or requirements better than others.

In order to provide these guarantees, some form of radio resource reservation is required to provide the requested QoS over the limited resources of the wireless communication links of the communication system. These limited resources in terms of bandwidth and possible bit rate are also effected by the fact that the wireless link can be effected by weather conditions and other unpredictable factors as is known in the art. The support of services that require some guarantees in the 2+ GPRS means that there is currently a need to be able to guarantee QoS in terms of the throughput of data in the data streams of the wireless communication links.

It is an aim of embodiments of the present invention to at least partly mitigate the above-referenced problems.

According to a first aspect of the present invention, there is provided a method for controlling a parameter of a data stream comprising data transmitted via a communication link in a wireless communication system, comprising:
  determining if said parameter satisfies an acceptable level; and
  if not, initiating at least one procedure, whereby a condition of the link is varied until the parameter satisfies said acceptable level.

According to a second aspect of the present invention, there is provided apparatus for controlling a parameter of a data stream comprising data transmitted via a communication link in a wireless communication system, comprising: means arranged to determine if said parameter satisfies an acceptable level; and means for initiating, if said parameter does not satisfy the acceptable level, a procedure whereby a condition of the communication link is varied until said parameter satisfies said acceptable level.

According to a third aspect of the present invention, there is provided a method for ensuring that a predetermined bit rate is provided in the throughput of a communication link in a wireless communication system, comprising the steps of: negotiating a guaranteed bit rate for the communication link; monitoring the bit rate of data throughput in the communication link; and if said monitored bit rate does not match the negotiated bit rate, triggering a correction procedure to control the bit rate of the data throughput.

Embodiments of the present invention provide the advantage that the network resources required to provide a requested QoS can be calculated and allocated to a particular data stream of a communication link.

Embodiments of the present invention may provide a policing unit which can monitor various quality parameters of a data stream and check if these parameters meet certain predefined minimum standards negotiated with user equipment in the communication system. As the QoS requested changes this can be signalled to a control unit in the communication system which can thus re-allocate the radio resources to improve the efficiency of the system.

Embodiments of the present invention provide the advantage that once a QoS has been agreed the fact that a data source node is providing data in a format which does not meet this quality can be identified and acted upon. Alternatively the fact that the attribute(s) of a communication link over which data provided by the data source is transmitted to a receiver node is degraded, they can be spotted and corrected to ensure that the input data is received at the receiver node at an acceptable standard.

For a better understanding of the present invention reference will now be made, by way of example only, to the accompanying drawings in which.

In the drawings like reference numerals refer to like parts.

Figure 1:
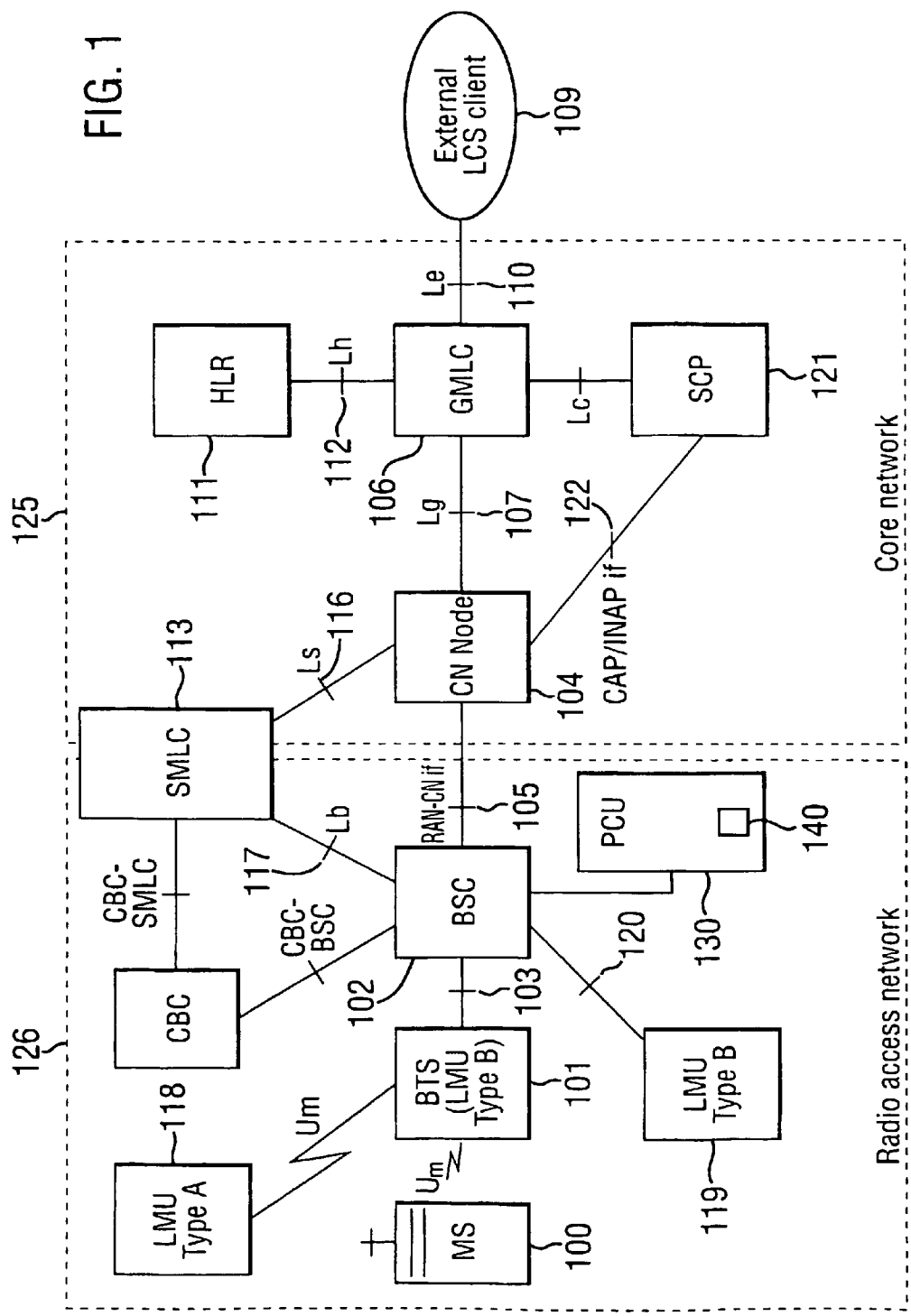
FIG. 1 illustrates a generic communication system logical architecture.

A general communication system logical architecture is illustrated in FIG. 1. It will be understood that embodiments of the present invention can be applied to other communication systems.

A mobile station (MS) 100 can be a mobile telephone or a laptop computer which has a radio modem or a fax adapted for radio access. The term MS will be understood to represent an example of mobile user equipment (UE). This communicates with the base transceiver station (BTS) 101 over the radio interface ($U_M$ Interface). The term BTS is used here also to cover the UMTS terrestrial radio access network (UTRAN) corresponding to the network element Node B. The BTS is equipment for transmission and reception of signals and may additionally include ciphering equipment. They communicate with the MS 100 via the $U_m$ interface. The BTS in turn communicates with a base station controller (BSC) 102 via link 103 (A-Bis in GMS or GPRS, lub in UMTS). The term BSC is used here also to cover the UTRAN corresponding network element which is the radio network controller (RNC). The BSC sets up the radio channels for signalling and traffic to the core-network (CN) node 104 via link 105. This forms part of the core-network 125.

The CN node 104 can be either a mobile switching centre (MSC) or serving GPRS support node (SGSN) depending on the switching domain (circuit switched or packet switched). The CN node 104 is a switching node having many functions. In particular, the CN node performs connection management, mobility management and authentication activities. In this example the CN node also contains the cell control function and service switching functions defined by the IN/CAMEL architecture. However, in the package switched domain these before-mentioned CN node functions may be split to separate network elements. Each CN node can control a number of BSC's which are referred to as being in an CN node service area. In general BTSs and BSCs together form the radio access network (RAN) 126, which is referred to as the base station sub-system (BSS) in GSM and GPRS and UTRAN in UMTS.

The CN node 104 is connected to the gateway mobile location centre (GMLC) 106 via the $L_g$ interface 107 which contains functionality required to support LCS. In one PLMN there may be more than one GMLC. The GMLC is the first node an external LCS client accesses in GSM PLMN. An LCS client 109 is a logical functional entity that requires, from the LCS server function in the PLMN, location information for one or more target MS with a specified set of parameters such as quality of service QoS. The LCS client may reside in an entity (including for example the MS), within the PLMN or in an entity external to the PLMN. An external LCS client 109 is shown by way of example only in FIG. 1 which communicates with the GMLC 106 via the $L_e$ interface 110.

In response to a location request from an LCS client, the GMLC may request routing information from the home location register (HLR) 111 of the system via the $L_h$ interface 112. The HLR is a database which allows a mobile subscriber to be permanently registered in the system. The HLR keeps track continuously of the location of a subscriber or MS i.e. via the Visitor Location Register (VLR) or SGSN. In addition to the HLR, each CN node 104 is associated with a database containing details of subscribers temporarily in the service area of that CN node. In circuit switched domain this database is called Visitor Location Register (VLR), and in the packet switched domain the database is contained in the SGSN.

After performing registration authorisation the GMLC 106 sends positioning requests to and receives final location estimates from, the CN node in the service area in which the MS is currently located (or visiting).

The serving mobile location centre (SMLC) 113 contains functionality required to support LCS. In one PLMN there may be more than one SMLC 113. The SMLC 113 manages the overall coordination and scheduling of resources required to perform positioning of a mobile station. It also calculates the final location estimate and accuracy.

Two types of SMLC are possible. These are the Core Network (CN) based SMLC, which supports the $L_s$ interface 116 which is the interface between the serving MLC and CN node, and the Radio Access Network (RAN) based SMLC which supports the $L_b$ interface 117 between the SMLC 113 and the BSC 102. A CN based SMLC supports the positioning of a target MS via signalling on the $L_s$ interface to the visited CN node. A RAN based SMLC supports positioning via signalling onto the $L_b$ interface. In UMTS, SMLC functionality is contained in the BSC 102, i.e. Radio Network Controller (RNC). The SMLC can control a number of location measurement units (LMU)'s for the purpose of obtaining radio interface measurements to locate or help locate MS subscribers in the area that it serves.

Figure 2:
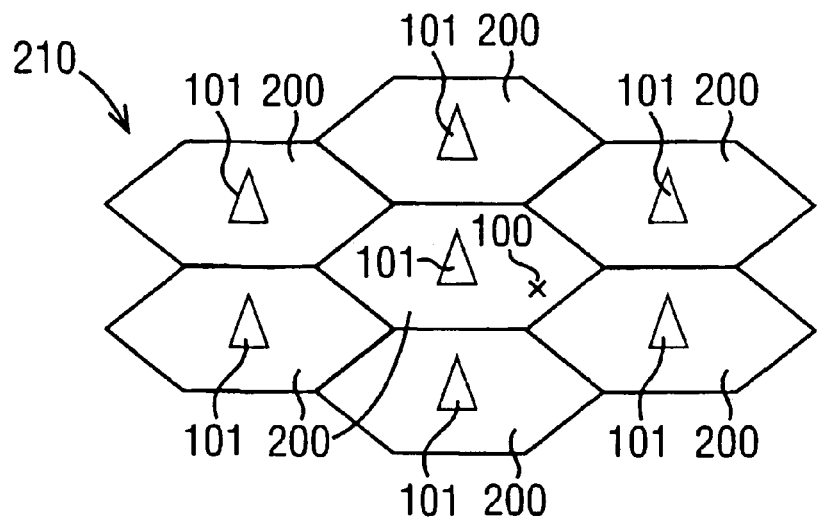
FIG. 2 illustrates the layout of cells in a communication system.

FIG. 2 shows a schematic illustration of the geographic layout of the various BTS's of a communication system. Each BTS 101 has an associated area of coverage which forms a cell 200 as is known in the art. A MS 100 in the communication system communicates over the $U_m$ interface with one or more of the BTS. The communication takes place as a wireless communication link which may be composed of many different channels as is known in the art. The channels may be shared by more than one user and thus the radio resource of the each BTS is shared. As the MS 100 moves throughout the cellular network 210 the signal strengths of the signals received from the various BTS's varies depending upon the proximity of the MS 100 to the BTS and upon other environmental factors. As a MS moves from the service area of one BTS to that of another a handover occurs as is also known in the art.

The resources of the wireless communication links between MS 100 and BTS 101 are of limited capacity. This can be determined, for example, by the type of traffic channels provided by the BTS transmitter. It will be understood that other effects also limit the resource. As a result it is not possible to have an unlimited number of MS users serviced by one BTS. In GPRS the packet control unit (PCU) 130 (shown in FIG. 1) controls how the radio resource is allocated between the various MS. In FIG. 1 the PCU is shown external to the BSC 102. It will be understood that the PCU could be integral with the BSC or could be in any other appropriate node of the communication system. Similar functionality will be present in other types of communication systems.

The PCU 130 includes admission control, channel allocation, scheduler, link adaptation and network controlled cell re-selection (NCCR) functionality. These functional elements control the transmission and receipt of data packets between the MS and SGSN and their equivalents.

Embodiments of the present invention provide a policing unit 140 which can be based in the PCU 130. The policing unit 140 watches the real time traffic on a communication link and thus monitors the flow of data packets in the data streams. Whilst the admission control and other functionality in the PCU 130 can be used to negotiate with a MS and calculate what network resources are required to provide the requested QoS and to determine if resources are available and to reserve them, the policing unit 140 monitors actual usage of the radio resource to check whether that usage is in line with the negotiated one. It will be understood that the policing functionality could be positioned in RNC, BTS, BSC, MS, separate server or in any suitable location in the Base Station System (BSS) of the communication system. Also the policing unit 140 could include the required functionality to renegotiate a required QoS if the quality of the transmission characteristics of the data stream do not reach, or are not maintained, at an acceptable level.

The QoS monitored by the policing unit could be the delay caused to data packets in a data stream or the bit error ratio of the data transferred. Other parameters indicating the transfer characteristics and/or demands could be watched. All of these parameters of the data stream (for data flow) can be crucial for different types of traffic classes which may be transmitted and received over the communication link. The following traffic classes are supported by embodiments of the present invention and these traffic classes are the types of traffic which will occur over the RAN between the access network and the core network of the communication system.

Conversational Traffic

Real time conversation schemes are characterised by the fact that the transfer time must be low because of the conversational nature of the scheme and at the same time that the time relation (variation) between information entitles of the stream must be preserved in the same way as for real time streams. Therefore the limit for acceptable transfer delay is very strict since failure to provide low enough transfer delay will result in an unacceptable lack of quality. The transfer delay requirement is therefore both significantly lower and more stringent than the roundtrip delay of the interactive traffic case set out below.

Streaming Traffic

This one scheme is characterised by the fact that the time relations (variation) between information entities (ie. samples, packets) within a flow must be preserved, although it does not have any requirements on low transfer delay. The delay variation of the end to end flow must be limited, to preserve the time relation (variation) between information entitles in the stream.

Interactive Traffic

When the end-user is online requesting data from remote equipment this scheme applies. Interactive traffic is characterised by the request response pattern of the end-user. At the message destination there is an entity expecting the message (response) within a certain time. Roundtrip delay time is therefore one of the key attributes. Another characteristic is the fact that the content of the packets must be transparently transferred (with low bit error ratio).

Background Traffic

When the end-users send and receive data files in the background this scheme applies. Examples are background delivery of emails, SMS, download of databases and reception of measured records. Background traffic is characterised by the fact that the destination is not expecting the data within a certain time. This scheme is thus more or less delivery time insensitive. Another characteristic is that the content of the packet must be transparently transferred (with low bit error ratio).

The main distinguishing factor between these various traffic classes is how delay sensitive the traffic is. Conversational class traffic is meant for traffic which is delay sensitive while background class traffic is the most delay insensitive traffic class. Conversational and streaming classes are mainly intended to be used to carry real time traffic flows (voice/audio, video etc.). Interactive class traffic and background traffic are mainly meant to be used by traditional internet applications like WWW, email, telnet and news. Due to looser delay requirements compared between conversational and streaming classes both provide better error rates by means of channel coding and retransmissions.

The QoS parameter monitored by the policing unit could also be the bit rate of the data stream. That is the speed at which data is successfully transmitted by a sender node and received by a receiver node. It will be understood that the communication link can be one way or two way and that thus a MS 100 could be either the sender or receiver node for a communication link.

Figure 3:
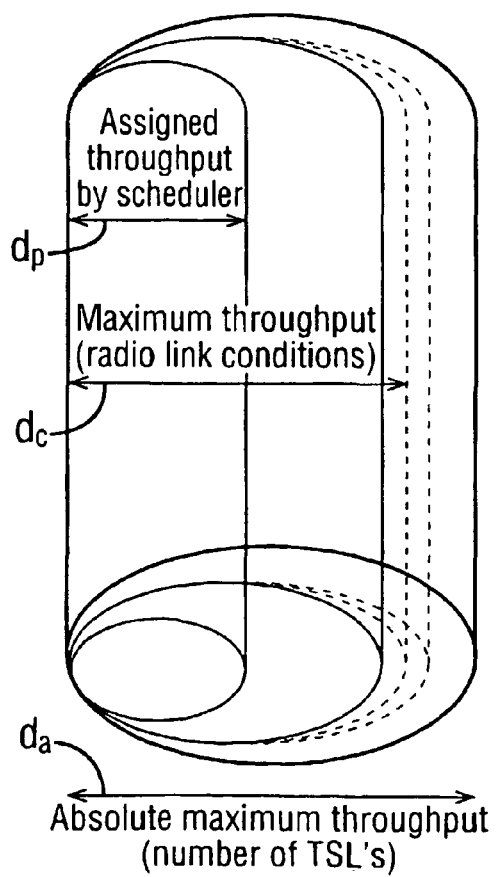
FIG. 3 illustrates the throughput of data via a communication link in a data system.

FIG. 3 illustrates how the throughput (or bit rate) of a communication link can be varied either under control of some form of resource management controller or as a result of environmental effects which cause a degradation to the wireless communication link. The throughput is illustrated as a pipe having a variable diameter (d).

The absolute maximum throughput has a diameter $d_a$. This represents the maximum bit rate or number of bits in a bit stream which could be transmitted over the link if conditions were ideal and the maximum number of time slots are used. A maximum throughput defined for the particular conditions (denoted by $d_c$) is shown. A communication link can be allocated up to this throughput via the radio resource allocation system (such as the Scheduler of the PCU). If a high QoS in terms of bit rate is required more of the available resource will be allocated. In FIG. 3 a portion of the available resource shown by $d_p$ is allocated which limits the number of data packets of a flow which should be sent through the pipe. It will be understood that this may be determined by the Scheduler in response to the QoS negotiated between a UE resource negotiating node of the communication system. As radio conditions change on the wireless communication link the QoS may no longer be adequately provided for and the required bit rate may not be adequately met.

In order to guarantee the QoS embodiments of the present invention provide a monitor (the policing unit 140) which can determine whether the negotiated QoS parameters are being provided via the communication link. This is achieved by measuring transmission characteristics (parameters) on the real time traffic on the communication link and comparing this to a predetermined threshold level which indicates an acceptable quality limit. If the measured characteristic is substantially less or greater than the threshold value this fact is signalled to the resource management functionality in the communication system which takes appropriate action to correct the situation.

Figure 4:
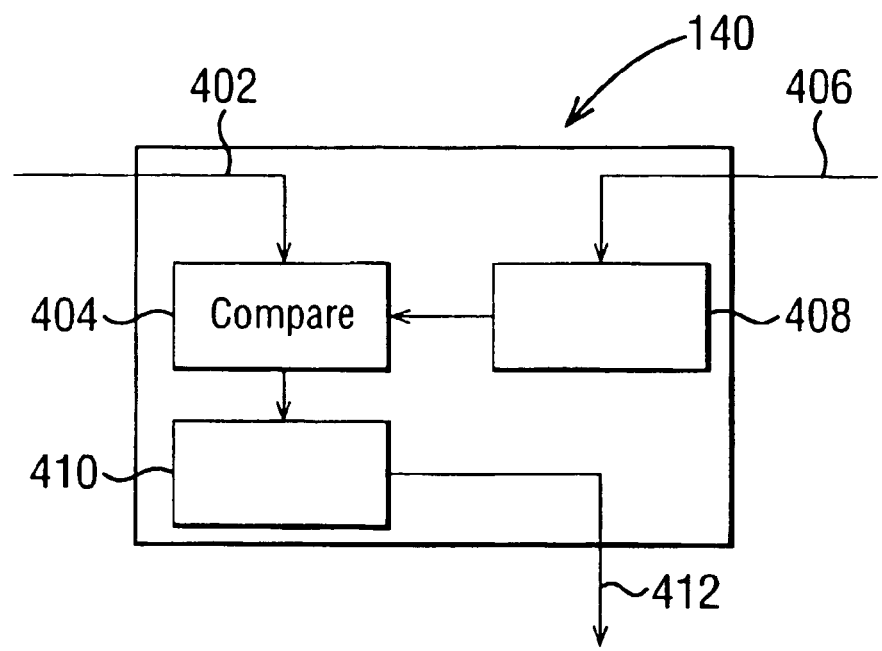
FIG. 4 illustrates a policing apparatus.

FIG. 4 illustrates a monitor 140 for watching whether the transmission characteristics of a data stream satisfy a negotiated characteristic in accordance with an embodiment of the present invention. The monitor receives signals on input 402 which indicate a pre-negotiated, and thus predetermined requirements like QoS parameters, such as for example, a minimum bit rate for the throughput. This is input into compare block 404. The monitor 140 watches the data streams transmitted via a communication link and receives signals 406 which indicate how many bits (or packets) have been received at a receiver node of the link. These may be, for example, the acknowledgement messages returned from the receiver during the normal operating of the communication system. A counter 408 counts the number of bits received and inputs these to the compare block 404. The number of bits received at the receiver node can thus be compared to the number of bits which are supposed to be guaranteed to support the pre-negotiated QoS. Whether or not the actually received number of bits is greater, less than, or substantially equal to, the expected threshold value is calculated in the compare block and in the control block 410. An output signal 412 indicates whether the QoS is being provided.

Policing is usually done differently for those service flows which have a negotiated guaranteed QoS and those which do not. For data packets of non-guaranteed flows packets exceeding the maximum bit rate are shaped (or buffered) back to conforming packets. That is to subsequent packets which are compatible with the buffered data. For service flows which have a guaranteed quality of service, for example as a result of a previous negotiation, the monitor will check whether the data source (traffic source) is sending packets exceeding the negotiated guaranteed bit rate but underneath the maximum bit rate. This is identified in control unit 410. If this is the case signals 412 can be generated to control the transmission of future data packets from the transmitter node (data source) of the communication link. These signals can be used to guarantee a predetermined throughput and enable a best effort policy be used for transmittal of data packets exceeding the negotiated rate. The policing unit 140 may also signal that a new QoS to take account of the increased data throughput generated by the data source should be agreed.

The monitor 140 thus has two basic tasks. Firstly, to measure the throughput of data on a communication link and mark (or identify) packets exceeding a pre-negotiated guaranteed bit rate. Signals from the monitor can be used in a Scheduler of the communication system to schedule excess data packets with non-guaranteed packets. This is possible if a sharing scheme is in operation.

The functionality to enable this control of transmittal of data units can be included in the Scheduler itself. Marking data packets which exceed the pre-arranged data QoS enables data integrity to be maintained. The marking function allows each type of traffic to be handled in the best way, since the different types of traffic (with different characteristics and requirements), are identified. Another function of the monitor 140 is to check whether the negotiated bit rate is being provided for the connection. The monitor can generate signals to identify when a possible degradation on a communication link has occurred which can be used to trigger certain correction procedures to counteract the problems.

One such correction procedure would be to carry out a handover procedure to reselect the cell via which the communication link is established. Carrying out a handover to a cell having a stronger signal would improve the wireless link which would be likely to increase possible data throughput, decrease delay of transmitted data and improve the bit error ratio. Alternatively, a different channel could be allocated for the communication link. Re-negotiating a different traffic channel could have similar advantages to those described above. A still further option is to instigate a renegotiation of the QoS which is required for the transfer of data. By renegotiating a lesser QoS required it is easier for the communication link to satisfy the desired guaranteed limits. In essence the acceptable levels are lowered.

The counter 408 measures the number of bits identified as received in the acknowledgement messages for a certain predetermined period of time. This period of time, or window may be defined by the network operator. When the counted bits representing bits which have been successfully transmitted over the communication link are less than the amount of bits which might be expected during that time if data was transmitted at the expected rate determined by the QoS provided, this can be due to two factors. Either the data source generating the traffic at the sender end of the communication link is providing less input data than expected or the radio network conditions of the communication link are degraded and are sufficiently bad that data is not being successfully transmitted or is suffering in success. In the former of these cases when the data input is provided below the expected data rate the monitor should detect this since no correction procedures need to be initiated. The radio link is satisfactory. Therefore if the number of radio link control (RLC) blocks to be marked as guaranteed is below the number of RLC blocks to be sent, the monitor disables any degradation of communication link report.

When the monitor 140 identifies that the quantity of data input at a sender node complies with an expected rate of data input but the provided throughput is below this value during the predetermined period of time, this fact is signalled via signals 412 to a Network Controlled Cell Reselection (NCCR) node in the communication system. The monitor has thus identified the fact that a parameter of the transmitted data stream is not at an acceptable level. (This might be because the bit rate is too low or delay caused to data packets too high or bit error ratio is too high).

Figure 5:
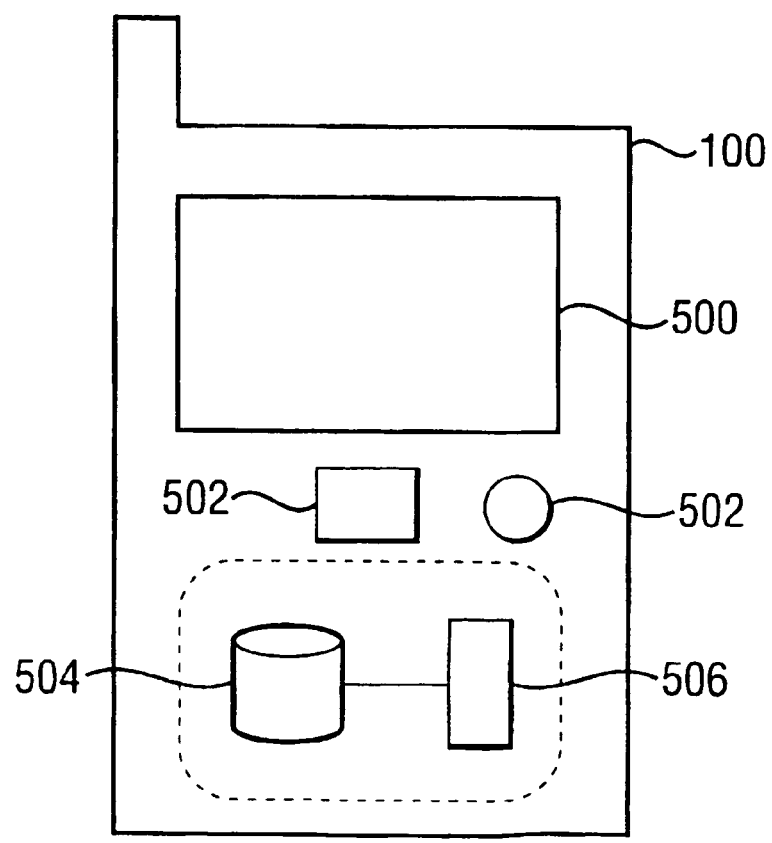
FIG. 5 illustrates a Mobile Station.

FIG. 5 shows a User equipment which is a Mobile Station 100 which can be used in accordance with embodiments of the present invention. The MS 100 includes a display 500 and buttons 502 which together with a microphone and earpiece (not shown) make up a user interface. The MS 100 is illustrated as cut away to reveal to a data store 504 and control unit 506 which enable operation of the MS. It will be understood that the traffic policing monitor 140 as described herein above could reside within the user equipment. In the latter case, different actions may be triggered in case of degradation, such as Mobile Originated Cell Re-selection or Re-negotiation for example.

Figure 6:
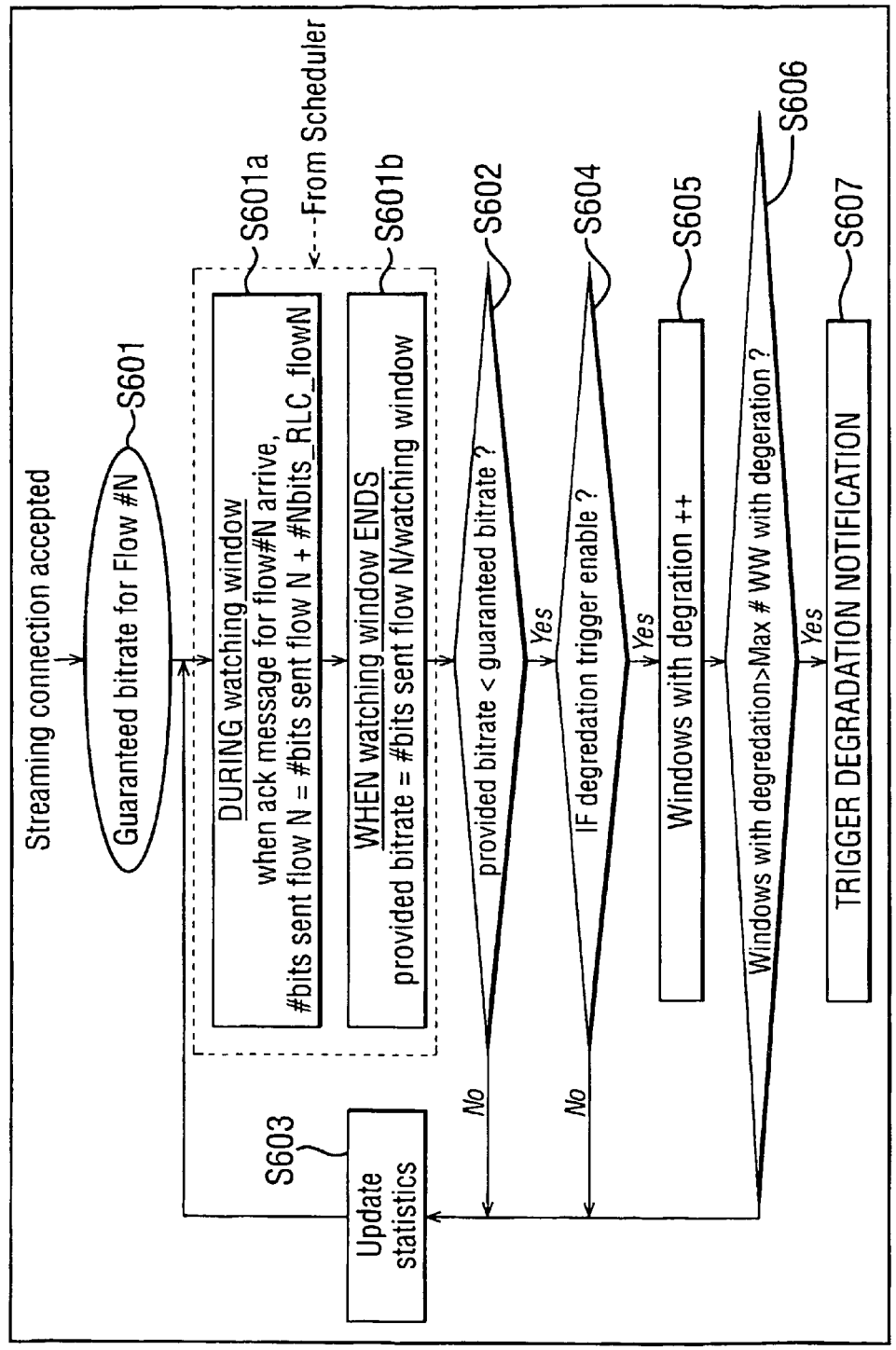
FIG. 6 illustrates operation of a Scheduler

FIG. 6 illustrates the operation of embodiments of the present invention in respect of a streaming traffic class. At step S601 the guaranteed bit rate (or any other suitable quality of service parameter) for a specific flow (number N) is established. Thereafter during step S601A, 601B the number of data bits sent in a data flow are monitored for a predetermined period of time. This is during a watching window. The data for calculating the number of bits sent in a flow maybe gathered from a Scheduler in the packet control unit of the communication system. The provided bit rate is determined as the number of bits acknowledged as received by a receiver node divided by the period of time for which the measurement window is open. This gives a calculated provided bit rate and at step S602 this is compared with the guaranteed bit rate which represents the bit rate required to provide a pre-negotiated quality of service. If the provided bit rate is not less than the guaranteed bit rate then the service being provided is satisfactory. If the bit rate is greater than the acceptable limit a check may be carried out to see if the data input at a sender node is higher than an expected level. In this case a new QoS could be negotiated. The results during the measurement window can be added to previous statistics gathered during previous measurement steps. This is step S603. If the provided bit rate is less than the guaranteed bit rate the policing monitor must establish whether this is due to the fact that little data is being input at the sender node of the communication link. If this is the case then the low bit rate is not due to a degradation on the communication link and the triggering of a communication link degradation signal should be disabled. This is established at step S604. If the amount of data input is low then the degradation trigger should not be enabled and the measured bit rates should be added to the previous measurement statistics at step S603. If the amount of data input at the sender node is as expected or higher then the degradation trigger is enabled. The amount by which the provided bit rate is less than the guaranteed bit rate is then established. A tolerance may be allowed so that if the bit rate (or other quality of service parameter) is substantially the same as the guaranteed bit rate then no signal indicating a degradation of the communication link is triggered. Substantially will be understood to mean that the quality of service parameter matches a required level or is sufficiently close to that level that it is good enough and within a pre-agreed tolerance limit. However, if the provided bit rate is substantially less than the guaranteed bit rate then the data transmitted during that period of time has been degraded due to a communication link. This is signalled at step S605. This may in itself be used to trigger a degradation signal. Alternatively as shown in FIG. 6 a further tolerance factor may by allowed for the number of times (or windows during which measurement is made) that a bit rate can fall below a negotiated level prior to triggering a correction procedure. This threshold, indicated by MAX in step S606 can be used to trigger a link degradation notification at step S607. If the number of windows during which a degradation has been identified is less than this maximum allowed number of windows then the results are added to the previous statistics and the method proceeds to the next period of measurement.

Figure 7:
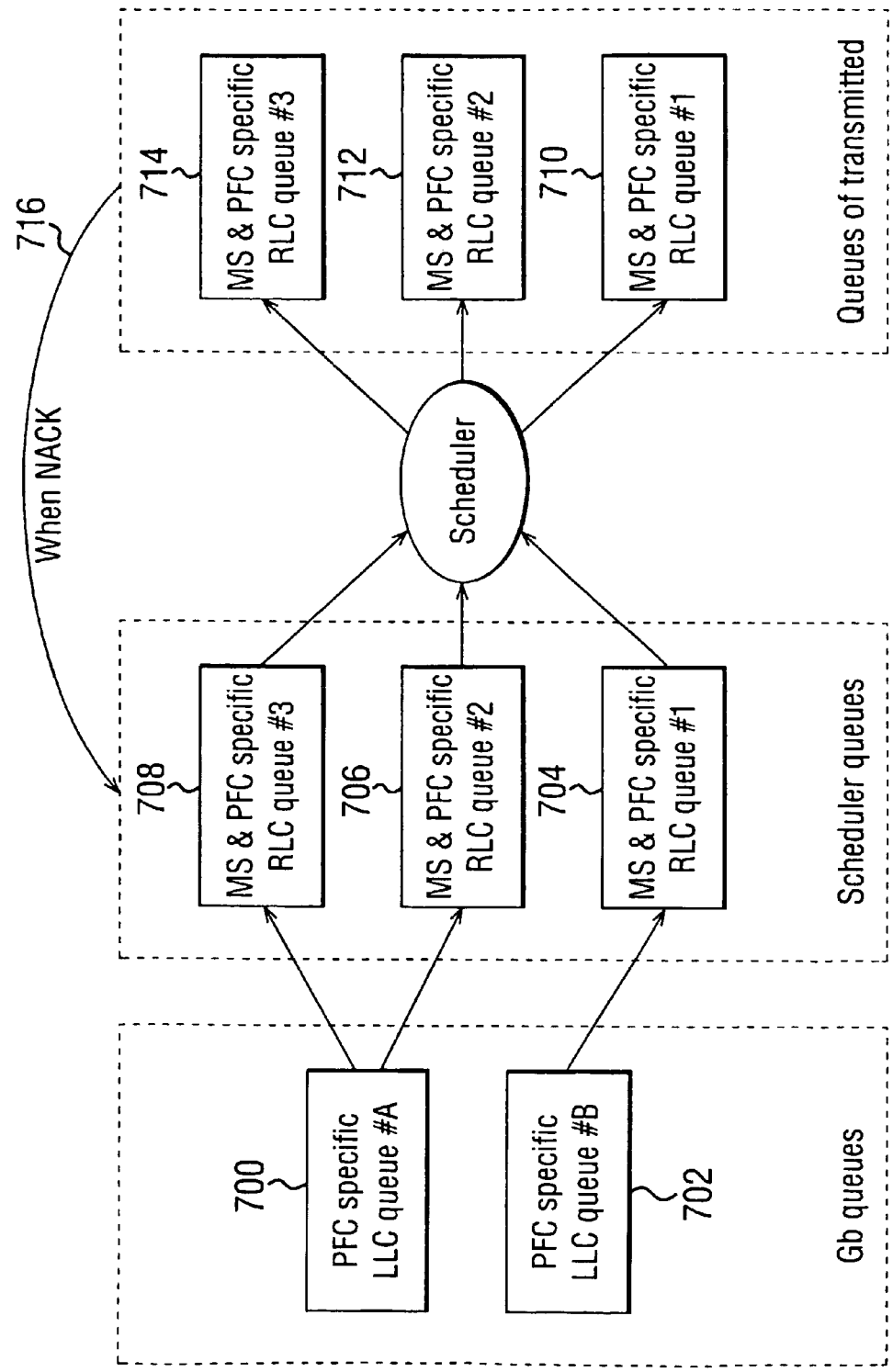
FIG. 7 illustrates a method for identifying a degradation in a communication link.

FIG. 7 illustrates how, for a streaming class of data traffic, data arriving in a Scheduler of a PCU is queued and how these queues are managed. By way of example FIG. 7 illustrates data arriving at the BSS Packet Flow Context (PFC) Logical Link Control (LLC), Packet Data Unit (PDU) from an SGSN 104. It will be understood that the LLC is the upper layer of Medium Access Control (MAC) and that the Radio Link Control (RLC) and MAC protocols provide the reliable access to the radio link Um as is well known. It will also be understood that a Temporary Block Flow (TBF) is a physical connection used by two radio resource entities (such a sender and receiver node) to support the transfer of LLC PDU's on packet data physical channels as is well known in the art. The data is queued in the LLC as queues A (700) and B (702). These are transferred to the Scheduler which may be reside in the PCU 130. The queues of LLC PDU's are separated into MS specific RLC queues at this stage. These are represented as RLC queues 1, 2 and 3 (704, 706, 708 respectively). The Scheduler prioritises these to be transmitted to an appropriate BTS and then onto the respective MS 100. Once transmitted the data is queued in the MS as queues 710, 712, 714. An acknowledgement signal 716 is sent from the MS to acknowledge receipt of the data transmitted. It is these acknowledgement signals which are monitored to obtain an indication of what data has been successfully transmitted. The acknowledgement signals can be used to identify the bit rate of transmitted data, the delay caused by the communication link to the transmitted data or the bit error ratio of the data transmitted. Other quality of service parameters can also be identified.

Embodiments of the present invention thus provide a policing function which can monitor the usage of radio resources on a wireless communication link. The policing function ensures that used resources are in line with expected pre-negotiated requirements. The policing function includes a counter which notes the transfer characteristics, for example the amount of sent bits, for each flow for which a quality of service has been negotiated and thus for which certain parameters must be guaranteed. The counter is updated when acknowledgement messages are received indicating that transmitted data has been received by a receiver node at one end of the communication link. The monitoring of the transmitted data is carried out for a certain period of time and may be repeated a number of times. When the counted bits, representing the successfully transmitted bits are less than the amount of bits expected the policing function provides signals which can be used to highlight a possible degradation on the communication link and to instigate correction procedures.

Embodiments of the present invention enable the transfer characteristics of a communication link to be monitored in real time and thus enable management of possible cell re-selection and re-negotiation of a quality of service to be carried out.

As noted above embodiments of the present invention can be used to provide a policing function in GPRS SGSN nodes. The policing monitor monitors the level of service being provided for a data stream on a communication link. The actual level of service provided is compared with pre-agreed parameters. Thereafter the radio resource over the wireless communication link can be managed. This can include allocating more of the radio resources to the particular data stream, by for example, allocating more bursts on a traffic channel for data transfer. Alternatively a new level of service can be re-agreed between the two parties to the communication occurring on the link. By signalling between themselves the two parties can agree a QoS which has less stringent requirements which are thus easier to meet and thus satisfy.

As a further alternative embodiments of the present invention can be used to trigger a handover procedure when the radio resource is degraded beyond a point at which a required level of service is no longer being provided. The policing monitor which monitors the radio resource may be used to signal a network controlled cell re-selection so that the cell and associated BTS via which the MS communicates with the rest of the communication system is changed. This can be done as soon as the provided level of service falls below a desired pre-agreed level or else a tolerance may be introduced so as to compensate for hysteresis effects to avoid a back and forth switching of cells when the provided quality on the radio resource is at or about the level at which the service becomes unacceptable.

It will be understood that present invention is not limited to the specific examples described here in above. Embodiments of the present invention can be used for GPRS/UMTS Networks or any other type of system including but not limited to EDGE, HSCSD and GPRS.

The invention claimed is:

1. A method for controlling a parameter of a data stream comprising data transmitted between a mobile user terminal and a service node via a communication link in a wireless communication system, comprising:

determining if said parameter satisfies an acceptable level;

if not, initiating at least one procedure, wherein a condition of the wireless communication link is varied until the parameter satisfies said acceptable level;

if said parameter satisfies the acceptable level, disabling the at least one procedure for a predetermined period of time; and subsequently repeating the determining if said parameter satisfies an acceptable level; and wherein the acceptable level represents a target bit rate for the throughput of the data stream and said parameter is the actual bit rate of the transmitted data stream.

2. The method as claimed in claim 1, further comprising:
determining a value for said parameter of the data stream transmitted via the communication link;
comparing said determined value with a threshold value indicating said acceptable level; and
responsive to said comparing, determining if said parameter satisfies an acceptable level.

3. The method as claimed in claim 1, further comprising:
negotiating a required quality of service for the communication link between a mobile user terminal and service node of the communication system; and
subsequently setting the acceptable level according to the negotiated quality of service.

4. The method as claimed in claim 2, further comprising:
determining the value for said parameter at a policing node of the communication system after measuring said parameter for a predefined period of time; and
subsequently determining if the determined value for the data stream is greater than or less than the threshold value.

5. The method as claimed in claim 4, further comprising:
if the determined value of the parameter is greater than the threshold value, managing the data stream to guarantee a minimum standard quality for said parameter for a portion of the data in said data stream;
marking the data units in a remainder portion of the data stream, and subsequently using a best effort policy for transmitting said marked data units.

6. The method as claimed in claim 1, further comprising:
if said actual bit rate of the data stream is less than the target bit rate, determining whether this is due to a low bit rate in the data input at a data source node of the communication link; and
if the low bit rate of the data stream is due to a low bit rate in the data input, indicating that the communication link is satisfactory.

7. The method as claimed in claim 6, further comprising:
if the bit rate of the data stream is less than the target bit rate, and if a bit rate in the data input or source is not low, determining that the wireless communication link is degraded.

8. The method as claimed in claim 1, wherein said at least one procedure comprises sending a signal to a network control node of the communication system indicating that the cell via which the mobile user terminal communicates with the communication system should be reselected, and subsequently carrying out a handover operation.

9. The method as claimed in 1 wherein said at least one procedure comprises allocating more radio resources to the communication link until the actual bit rate of the data stream is greater than or equal to the target bit rate.

10. The method as claimed in 1 wherein said at least one procedure comprises reselecting the target rate by negotiating a reduced quality of service for the communication link.

11. Apparatus for controlling a parameter of a data stream comprising data transmitted via a communication link in a wireless communication system, comprising:
a determining unit configured to determine if said parameter satisfies an acceptable level; and
an initiating unit configured to initiate, if said parameter does not satisfy the acceptable level, a procedure in which a condition of the communication link is varied until said parameter satisfies said acceptable level;
a disabling unit configured to disable the procedure, if said parameter does satisfy the acceptable level, for a predetermined period of time, and to re-enable said procedure after said predetermined period of time; and
wherein the acceptable level represents a target bit rate for the throughput of the data stream and said parameter is the actual bit rate of the transmitted data stream.

12. Apparatus as claimed in claim 11 further comprising:
a negotiating unit configured to negotiate with at least one mobile user terminal in the communication system to establish a predetermined quality to be satisfied by the data stream; and
subsequently set a threshold value indicating the predetermined quality to be met by the data stream.

13. Apparatus as claimed in claim 11, wherein the acceptable level comprises a minimum bit rate for the throughput of the data stream; and
the apparatus further comprises a counter configured to receive acknowledgement signals from a receiver node of the communication link, said signals indicating the number of data bits received at the receiver node.

14. Apparatus as claimed in claim 11, further comprises a comparison unit configured to compare the number of data bits received at the receiver node during a predetermined period of time with an target number of data bits calculated in response to the acceptable level.

15. Apparatus as claimed in 12, further comprising:
signal generating unit responsive to a difference between the parameter of the data stream and the acceptable level for generating at least one control signal which initiates said at least one procedure.

16. A method for ensuring that a predetermined bit rate is provided in the throughput of a communication link in a wireless communication system, comprising:
negotiating a guaranteed bit rate for the communication link;
monitoring the bit rate of data throughput in the communication link; if said monitored bit rate does not match the negotiated bit rate, triggering a correction procedure to control the bit rate of the data throughput;
if said monitored bit rate does match the negotiated bit rate, disabling the correction procedure for a predetermined period of time; and
subsequently repeating the monitoring the bit rate of data throughput in the communication link.

17. The method as claimed in claim 16, wherein the correction procedure comprises a handover procedure to reselect a cell of the communication system via which the communication link is made.

18. The method as claimed in claim 16, wherein the correction procedure comprises renegotiated a new guaranteed bit rate.

19. The method as claimed in claim 16, wherein the correction procedure comprises reallocating a new communication channel of the communication system for the communication link.

20. The method as claimed in claim 16 wherein said negotiating a guaranteed bit rate comprises:
signalling, via a mobile user equipment, a required quality of service to a support node of the communication system; and
subsequently receive, at the mobile user equipment, an acceptance signal from the support node indicating that the quality of service supplied by the communication system will satisfy the required quality of service.

21. Apparatus for controlling a parameter of a data stream comprising data transmitted via a communication link in a wireless communication system, comprising:
means for determining if said parameter satisfies an acceptable level; and means for initiating, if said parameter does not satisfy the acceptable level, a procedure whereby a condition of the communication link is varied until said parameter satisfies said acceptable level;

means for disabling the procedure, if said parameter does satisfy the acceptable level, for a predetermined period of time; and means for repeating the determining if said parameter satisfies the acceptable level;

wherein the acceptable level represents a target bit rate for the throughput of the data stream and said parameter is the actual bit rate of the transmitted data stream.

22. A computer program embodied on a computer-readable medium and executed by a processor for ensuring that a predetermined bit rate is provided in the throughput of a communication link in a wireless communication system, the program performs:

negotiating a guaranteed bit rate for the communication link;

monitoring the bit rate of data throughput in the communication link;

if said monitored bit rate does not match the negotiated bit rate, triggering a correction procedure to control the bit rate of the data throughput;

if said monitored bit rate does match the negotiated bit rate, disabling the correction procedure for a predetermined period of time; and repeating the step of monitoring the bit rate of data throughput in the communication link.

23. The program as claimed in claim 22, wherein the correction procedure comprises a handover procedure to reselect a cell of the communication system via which the communication link is made.

24. The program as claimed in claim 22, wherein the correction procedure comprises renegotiated a new guaranteed bit rate.

25. The program as claimed in claim 22, wherein the correction procedure comprises reallocating a new communication channel of the communication system for the communication link.

26. The program as claimed in claim 22 wherein said negotiating a guaranteed bit rate comprises:

signalling, via a mobile user equipment, a required quality of service to a support node of the communication system; and receive, at the mobile user equipment, an acceptance signal from the support node indicating that the quality of service supplied by the communication system will satisfy the required quality of service.

* * * * *